(12) United States Patent
Shrivastava et al.

(10) Patent No.: US 12,481,563 B2
(45) Date of Patent: Nov. 25, 2025

(54) SITE AND STORAGE TIER AWARE REFERENCE RESOLUTION

(71) Applicant: Nutanix, Inc., San Jose, CA (US)

(72) Inventors: Brajesh Kumar Shrivastava, Bihar (IN); Kai Tan, Cary, NC (US); Pranab Patnaik, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 101 days.

(21) Appl. No.: 18/236,160

(22) Filed: Aug. 21, 2023

(65) Prior Publication Data

US 2024/0330118 A1 Oct. 3, 2024

(30) Foreign Application Priority Data

Mar. 28, 2023 (IN) .............................. 202341022470

(51) Int. Cl.
 *G06F 11/00* (2006.01)
 *G06F 11/14* (2006.01)
(52) U.S. Cl.
 CPC ...... *G06F 11/1464* (2013.01); *G06F 11/1466* (2013.01)
(58) Field of Classification Search
 CPC ............. G06F 11/1453; G06F 11/1464; G06F 11/1448; G06F 11/1469; G06F 11/1435; G06F 11/2094; G06F 11/1458
 See application file for complete search history.

(56) References Cited

U.S. PATENT DOCUMENTS 8,140,484 B2   3/2012 Blitzer et al.
8,549,518 B1   10/2013 Aron et al.
8,601,473 B1   12/2013 Aron et al.
8,850,130 B1   9/2014 Aron et al.
8,863,124 B1   10/2014 Aron et al.
(Continued)

FOREIGN PATENT DOCUMENTS

EP        4124968 A1    2/2023

OTHER PUBLICATIONS

Cano, Ignacio, "Curator: Self-Managing Storage for Enterprise Clusters" University of Washington; published Mar. 2017; pp. all.
(Continued)

*Primary Examiner* — Charles Ehne
(74) *Attorney, Agent, or Firm* — Cesari and McKenna,LLP

(57) ABSTRACT

A site and storage tier aware technique replicates data as one or more recovery points (RPs) from a primary site to a secondary site in a multi-site data replication environment. A storage tier aware reference resolver determines (i) an amount of RP data transfer associated with the replication and (ii) location information associated with a cloud storage tier storing the RP data in an object store. The storage tier aware reference resolution aspect provides two additional factors to consider when retrieving data of a reference RP from cloud storage: (iii) the time (duration) needed to retrieve the data and (iv) the cost (financial expense) needed to retrieve the data. In addition, a site aware reference resolution aspect of the technique determines an optimal RP to use as the reference RP and involves consideration of (v) which RPs have been replicated from the primary site to the secondary site and (vi) which RPs have been retained for storage at the sites.

24 Claims, 10 Drawing Sheets

(56) References Cited

U.S. PATENT DOCUMENTS

| | | | |
|---|---|---|---|
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,747,287 | B1 | 8/2017 | Bhardwaj et al. |
| 10,210,054 | B1 | 2/2019 | Mehrotra et al. |
| 10,657,006 | B2 | 5/2020 | Burshan et al. |
| 11,243,851 | B2 | 2/2022 | Saad et al. |
| 11,272,006 | B2 | 3/2022 | Saad et al. |
| 11,829,328 | B2 | 11/2023 | Gupta et al. |
| 2013/0005453 | A1 | 1/2013 | Sengupta et al. |
| 2014/0250080 | A1* | 9/2014 | Gardner ............. G06F 11/1446 707/646 |
| 2015/0030190 | A1 | 1/2015 | Tadano |
| 2016/0002653 | A1 | 1/2016 | Poluri |
| 2022/0030901 | A1 | 2/2022 | Jiang et al. |
| 2022/0066882 | A1* | 3/2022 | Wang ................. G06F 12/0253 |
| 2023/0002967 | A1 | 1/2023 | Gupta et al. |
| 2023/0029616 | A1* | 2/2023 | Pandit ..................... G06F 3/067 |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Mansouri, Yaser, and Rajkumar Buyya. "To move or not to move: Cost optimization in a dual cloud-based storage architecture." Science Direct, Journal of Network and Computer Applications, Aug. 29, 2016, 5 pages. https://www.sciencedirect.com/science/article/abs/pii/S1084804516301977?via%3Dihub.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https://nutanixbible.com/, dated Jan. 3, 2024, 282 pages.

Wilson, Michael "Establishing RPO and RTO Targets for Cloud Applications" Jun. 16, 2022, 4 pages. https://aws.amazon.com/blogs/mt/establishing-rpo-and-rto-targets-for-cloud-applications/.

* cited by examiner

SITE AND STORAGE TIER AWARE REFERENCE RESOLUTION

CROSS-REFERENCE TO RELATED APPLICATION

The present application claims the benefit of India Provisional Patent Application Serial No. 202341022470, which was filed on Mar. 28, 2023, by Brajesh Kumar Shrivastava, et al. for SITE AND STORAGE TIER AWARE REFERENCE RESOLUTION, which is hereby incorporated by reference.

BACKGROUND

Technical Field

The present disclosure relates to data replication and, more specifically, to efficient data replication in a multi-site environment.

Background Information

Data replication generally involves copying or replicating data among multiple storage systems or datacenters in a multi-site environment configured as, e.g., a disaster recovery deployment. Data to be replicated from a primary site may be generated by a snapshot of a virtual disk, and replicating the snapshot data to a secondary site. Thereafter, periodic incremental replications of the data (e.g., incremental snapshots) may be made to ensure that the secondary site is updated and synchronized with the latest data at the primary site. However, there may be deployments of the multi-site replication environment where every incremental snapshot is not replicated from the primary site to the secondary site and where each site may retain only a subset of the incremental snapshots, e.g., as recovery points (RPs), according to a retention policy that may differ among the sites.

Moreover, a cloud service provider (CSP) may offer various/different tiers of cloud storage for the secondary site of the multi-site environment. Each tier of storage may be priced separately based on storage capacity consumed and data retrieval cost, as well as the storage medium, e.g., solid state drives (SSDs), hard disk drives (HDDs), optical disks, tape storage, etc. Depending on the particular multi-site replication "storage tier" deployment, the snapshot data may be stored in any (or all) of the cloud storage tiers. Accordingly, it is difficult to organize when and in what tier data should be stored and retrieved according to cost and speed of retrieval as well as other criteria.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
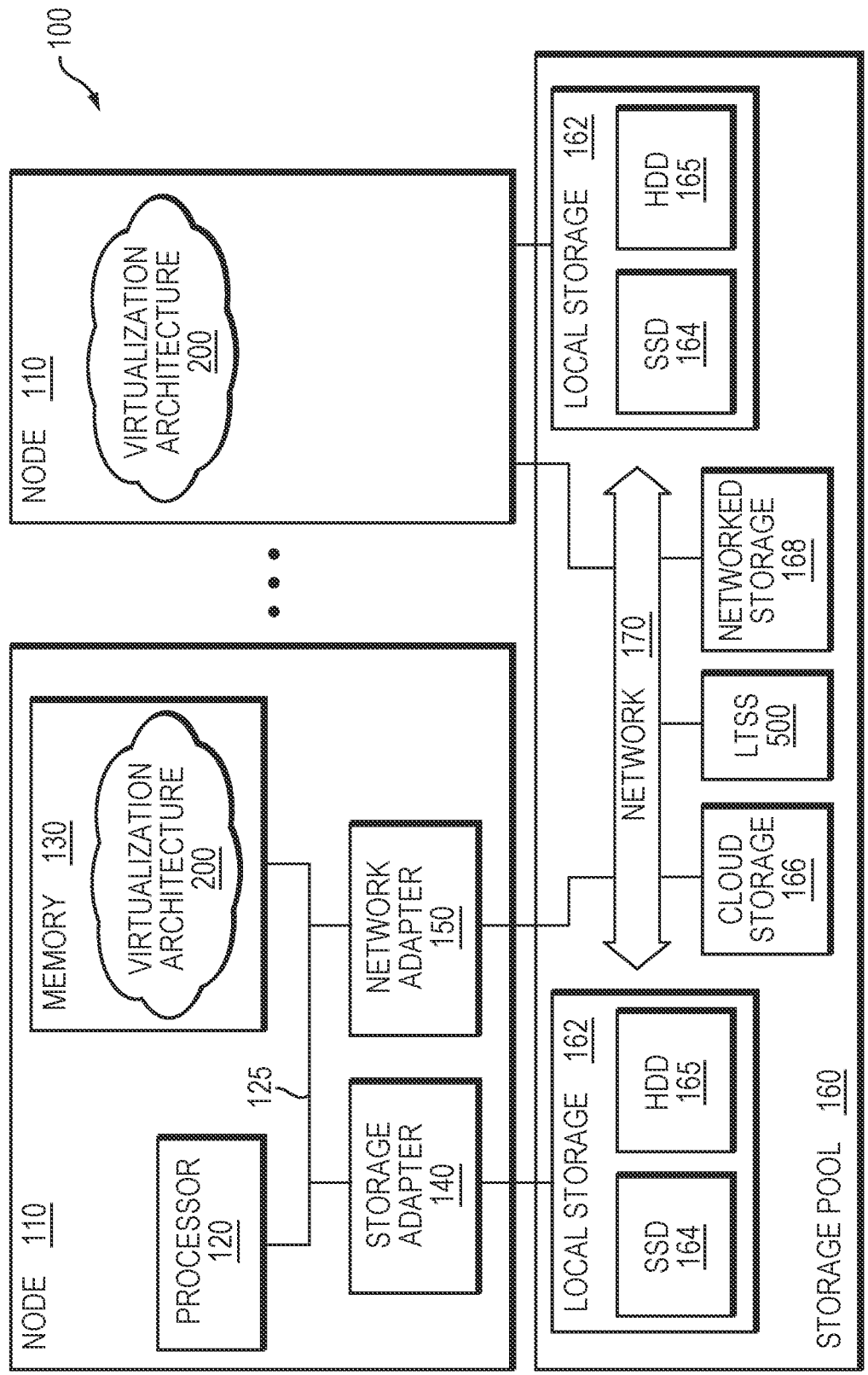
FIG. 1 is a block diagram of a plurality of nodes interconnected as a cluster in a virtualized environment.

The embodiments described herein are directed to a site and storage tier aware technique for replicating data from a primary site to a secondary site in a multi-site data replication environment configured as, e.g., backup, archival storage, and disaster recovery (DR) deployments. Illustratively, the primary site may be embodied as an on-premises cluster configured to generate and replicate data (e.g., application data of a workload) as one or more snapshots for storage on the secondary site, which may be embodied as an archival storage appliance configured to provide a backup data service to cloud storage of a cloud service provider (CSP). The replicated snapshots include a full baseline snapshot followed by incremental snapshots, any of which may be retained as one or more recovery points (RPs) at the sites. Notably, the CSP such as, e.g., Amazon Web Services (AWS) S3 storage services, Google Cloud Storage, Microsoft Azure Cloud Storage and the like, may offer various/different tiers of cloud storage of, e.g., an object store, for storing the RPs at the secondary site.

In an embodiment, a control plane service (e.g., replication manager) executing on a node of the on-premises cluster cooperates with a data plane service (e.g., data I/O manager) of the cluster to generate, replicate and retrieve the RPs to/from a long-term storage service (LTSS) of the archival storage appliance for storage on the cloud storage. To that end, the replication manager may also cooperate with the LTSS to implement a storage tier aware reference resolver of the technique to determine (i) an amount of RP data transfer associated with the replication (or retrieval) and (ii) metadata (location information) identifying a specific cloud storage tier having the RP data as well as location information within the that cloud storage tier storing the RP data in the object store.

In an embodiment, the site and storage tier aware technique is also configured to retrieve data from the secondary site to the primary site for use as a reference RP when restoring application data of the workload in the multi-site environment deployments. Here, the storage tier aware reference resolution aspect provides two additional factors to consider when retrieving data of a reference RP from cloud storage: (iii) the time needed to retrieve the data, i.e., a time factor (duration); and (iv) the cost (financial expense based on CSP fees) needed to retrieve the data, i.e., a cost factor. For example, a DR environment deployment may optimize for the time factor (to quickly retrieve the data) based on a recovery time objective (RTO) constraint, whereas an archival storage environment deployment may optimize for the cost factor (to reduce the cost to retrieve data).

The replication manager and LTSS may further cooperate to implement a site aware reference resolver of the technique to determine an optimal RP to use as a reference RP, e.g., for restoring the workload at the primary site in the event of a failure. This aspect of the technique involves consideration of (v) which RPs have been replicated from the primary site to the secondary site and (vi) which RPs have been retained for storage at the sites.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. As described herein, a long-term storage service (LTSS 500) of an archival storage system provides storage of large numbers (amounts) of point-in-time images or recovery points (i.e., snapshots) of application workloads on an object store. Communication over the network 170 may be affected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
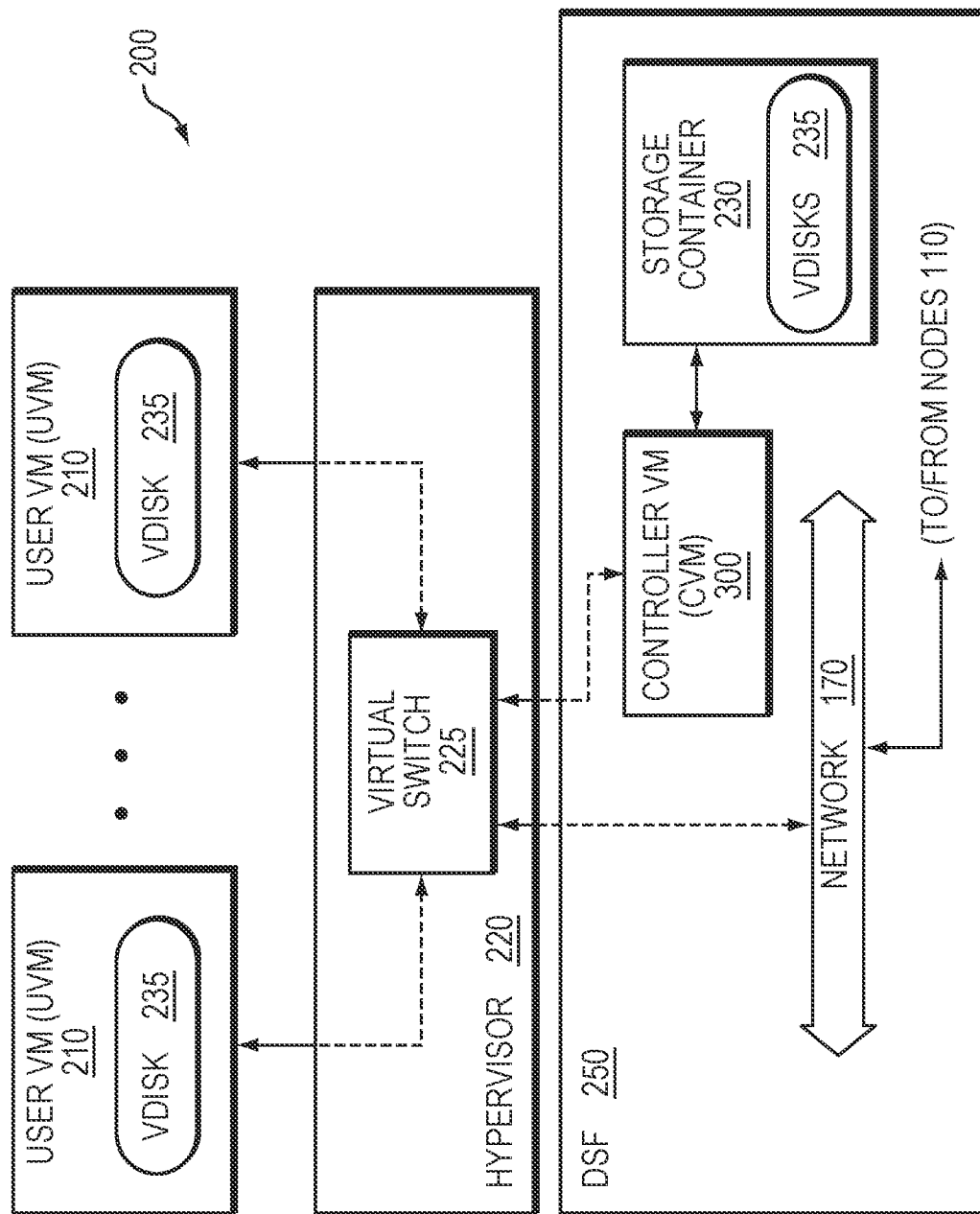
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster wide.

The client software (e.g., one or more user applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
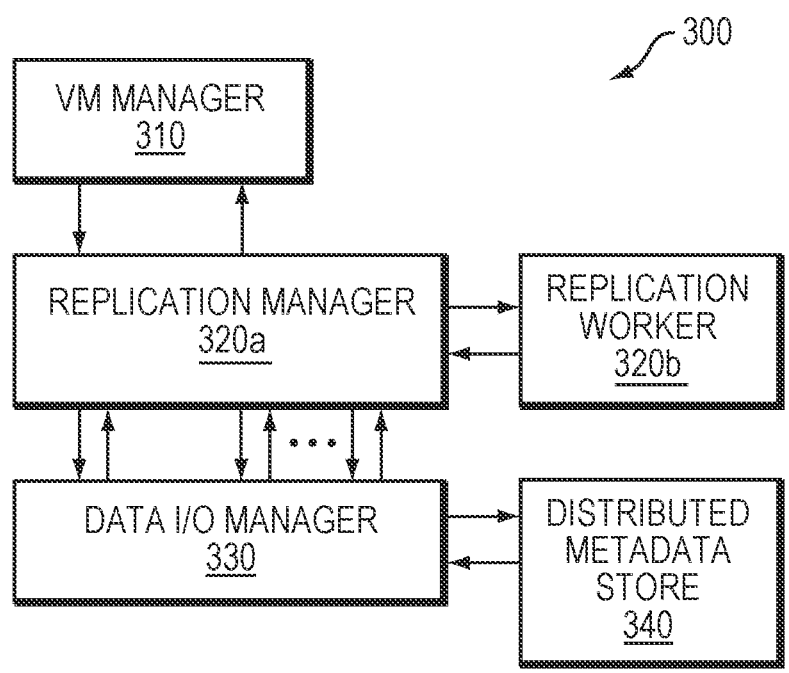
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O) activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack running in a user space of the operating system of the CVM to provide storage and I/O management services within DSF 250. The processes include a virtual machine (VM) manager 310 configured to manage creation, deletion, addition, and removal of virtual machines (such as UVMs 210) on a node 110 of the cluster 100. For example, if a UVM fails or crashes, the VM manager 310 may spawn another UVM 210 on the node. A replication manager 320a is configured to provide replication and disaster recovery capabilities of DSF 250. Such capabilities include migration/failover of virtual machines and containers. In an embodiment, the replication manager 320a may interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. In an embodiment, the data I/O manager 330 and replication manager 320 cooperate with DSF 250 to schedule and generate. i.e., provide support for, snapshots, which are point-in-time copies of storage objects, such as files, LUNs and/or vdisks. A distributed metadata store 340 stores and manages all metadata in the node/cluster, including metadata structures that store metadata used to locate (map) the actual content of vdisks on the storage devices of the cluster.

Figure 4:
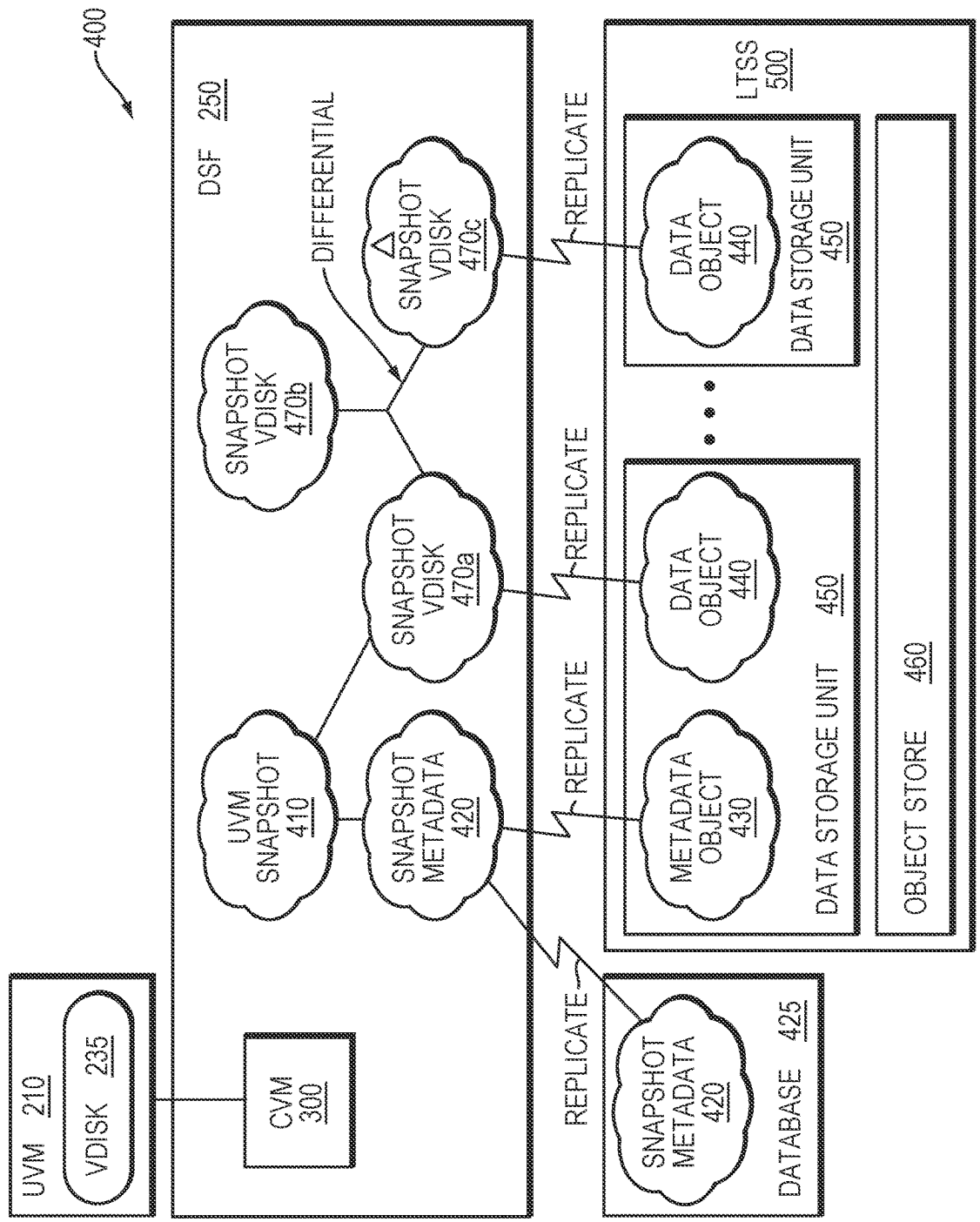
FIG. 4 is a block diagram of an exemplary data replication environment configured to replicate snapshots for storage to a long-term storage service (LTSS) of an archival storage system.

The embodiments described herein are related to an indexing technique configured to provide an index data structure for efficient retrieval of data of a snapshot from the LTSS of the archival storage system. FIG. 4 is a block diagram of an exemplary data replication environment 400 configured to replicate snapshots for storage to the LTSS of the archival storage system. The architecture of LTSS 500 is configured to process large amounts of point-in-time images or recovery points (i.e., snapshots) of application workloads for storage on an object store 460 (archival storage vendor such as Amazon AWS S3 storage services, Google Cloud Storage, Microsoft Azure Cloud Storage and the like), wherein the workloads are characterized by a logical entity having typed data, e.g., a virtual machine (VM) such as a UVM 210. A client of LTSS 500 may be a distributed file system of a storage system (e.g., CVM 300 of DSF 250) that generates snapshots of the UVM (e.g., data processed by a user application running in the UVM) and replicates the UVM snapshot 410 for storage in the object store 460. Replication, in this context, is directed to storage devices that exhibit incremental, block-level changes. LTSS 500 is thus a "generic" long-term storage service of an archival/backup storage system from the perspective of the client, i.e., the client flushes (delivers) data blocks of UVM snapshots 410 to the LTSS 500, which organizes the blocks for possibly long-term storage within objects of the object store 460. Each UVM snapshot 410 is generally handled as a data storage unit 450 by LTSS 500.

Illustratively, the content of each UVM snapshot 410 includes snapshot metadata and snapshot data, wherein the snapshot metadata 420 is essentially configuration information describing the logical entity (e.g., UVM 210) in terms of, e.g., virtual processor, memory, network, and storage device resources of the UVM. The snapshot metadata 420 of the UVM 210 is illustratively replicated for storage in a query-able database 425 although, in an embodiment, the snapshot metadata 420 may be further replicated and organized as a metadata object 430 within a configuration namespace (e.g., bucket) of the object store 460 of LTSS 500 for long-term durability and availability. The data of the UVM 210 is virtualized as a disk (e.g., vdisk 235) and, upon generation of a snapshot, is processed as snapshot vdisk 470 of the UVM 210. The snapshot vdisk 470 is replicated, organized, and arranged as one or more data objects 440 of the data storage unit 450 for storage in the object store 460. In some embodiments, the metadata of metadata object 430 is stored in relevant data objects 440 without a need for the separate metadata object 430. The data is stored on a storage device of the object store as extents (i.e., contiguous data slices). Each extent of the snapshot vdisk 470 is a contiguous range of address space within a data object 440, wherein the extents are "packed" into the data object 440 and accessible by, e.g., offsets and lengths. Note that a preferred size (e.g., 16 MB) of each data object 440 may be specified by the object store/vendor (e.g., AWS S3 cloud storage) for optimal use of the object store/vendor.

Operationally, the client initially generates a full snapshot (a snapshot referencing all blocks at a point-in-time) of vdisk 235 (e.g., snapshot vdisk 470a) and transmits copies (i.e., replicas) of its data blocks to effectively replicate the snapshot vdisk 470a to LTSS 500. The snapshot vdisk 470a is thereafter used as a reference snapshot for comparison with one or more subsequent snapshots of the vdisk 235 (e.g., snapshot vdisk 470b) when computing incremental differences (deltas Δs). To support a Recovery Point Objective (RPO), the client (e.g., CVM 300) generates the subsequent vdisk snapshots 470b at predetermined (periodic) time intervals and computes the deltas of these periodically generated snapshots with respect to the reference snapshot. The CVM 300 transmits replicas of data blocks of these deltas as Δ snapshot vdisk 470c to LTSS. Note that from the perspective of the CVM 300, the LTSS 500 is a storage entity having an address on the network 170 (or WAN), similar to any networked storage 168. However, unlike networked storage 168, which is generally exposed to (accessed by) the CVM 300 using filesystem protocols such as NFS. CIFS and iSCSI, the LTSS 500 is accessed using specialized application program interfaces (APIs) referred to herein as replication APIs, which have rich descriptive semantics for managing, storing, and retrieving the snapshots retained in the LTSS. For example, a replication API may specify the snapshotted vdisk 470a of the logical entity (e.g., UVM 210) as well as information describing the snapshot metadata 420 and snapshot vdisk 470a of the entity for locating and storing or retrieving data from the LTSS. The CVM 300 then transmits (replicates) a stream of data blocks of the snapshotted vdisk 470a to LTSS 500.

Figure 5:
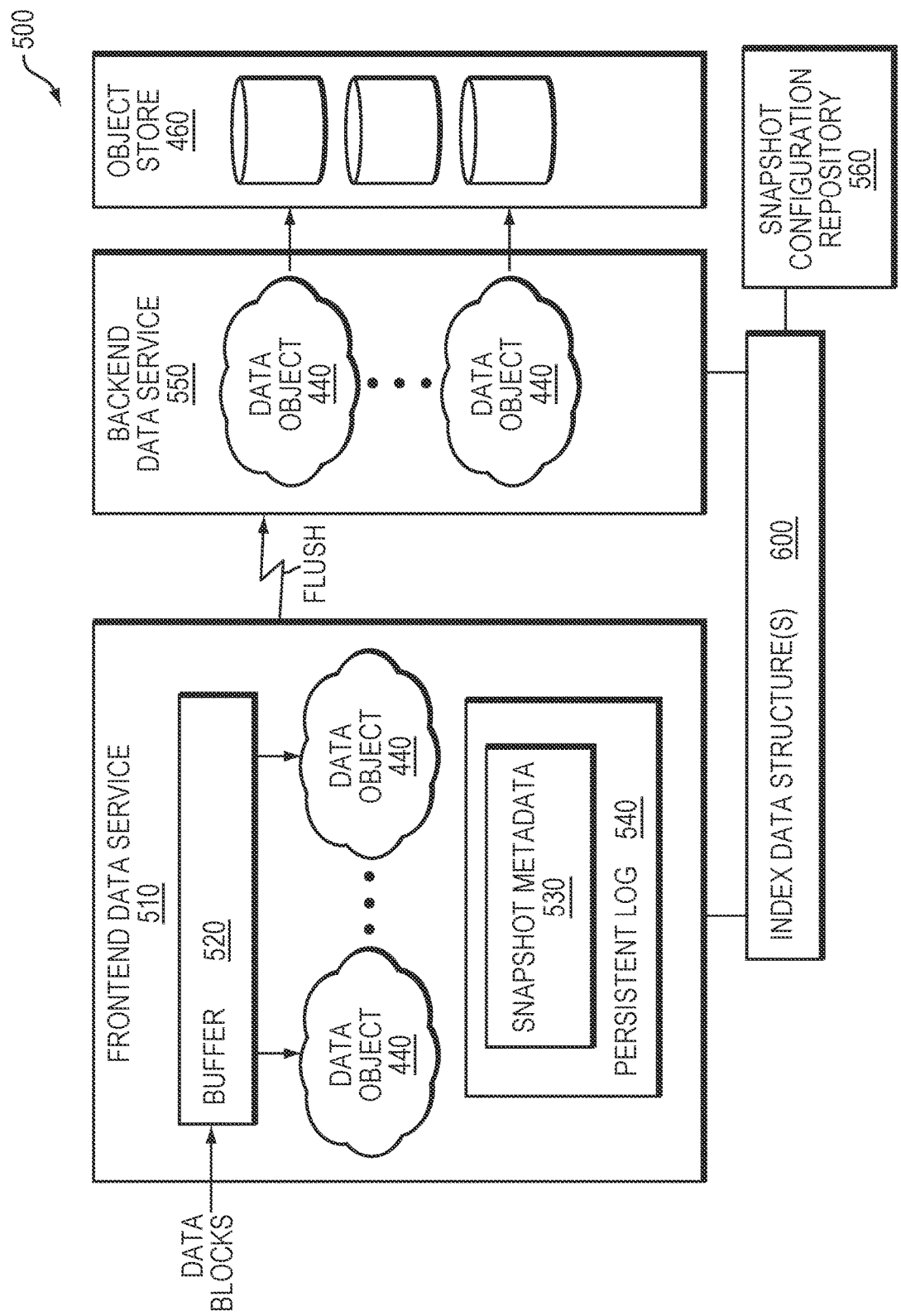
FIG. 5 is a block diagram of the LTSS of the archival storage system.

FIG. 5 is a block diagram of the LTSS 500 of the archival storage system. Illustratively, the LTSS 500 includes two data services (processes): a frontend data service 510 that cooperates with the client (e.g., CVM 300) to organize large amounts of the replicated snapshot data (data blocks) into data objects 440 and a backend data service 550 that provides an interface for storing the data objects 440 in the object store 460. In an embodiment, the LTSS data services/processes may execute on a computing platform at any location (e.g., may be geographically separate from a location of the object store) and is generally "stateless" as all data/metadata are stored on the object store 460. That is, the LTSS is a serverless transactional service that may execute anywhere that has a network connection to the object store and the CVM. Accordingly, the frontend data service 510 and backend data service 550 may run either locally on a node of an "on-premises" cluster or remotely on a node of an "in-cloud" cluster. In response to receiving an initial replication API directed to the snapshot vdisk 470a, the frontend data service 510 temporarily stores the stream of data blocks of the snapshot vdisk 470a, e.g., in a buffer 520 and writes the data blocks into one or more extents (i.e., contiguous, non-overlapping, variable-length regions of the vdisk) for storage in data objects 440 of a preferred size (e.g., 16 MB) as specified by the object store vendor for optimal use. The frontend data service 510 then forwards (flushes) the data objects 440 to the backend data service 550 for storage in the object store 460 (e.g., AWS S3). In response to receiving a subsequent replication API directed to the Δ snapshot vdisk 470c, the frontend data service temporarily stores the stream of data blocks of the Δ snapshot vdisk 470c in buffer 520, writes those data blocks to one or more data objects 440, and flushes the objects to the backend data service 550.

Prior to flushing the data objects 440 to the backend data service 550, the frontend data service 510 creates metadata that keeps track of the amount of data blocks received from the CVM 300 for each replicated snapshot, e.g., snapshot vdisk 470a as well as Δ snapshot vdisk 470c. The metadata associated with the snapshot (i.e., snapshot metadata 530) is recorded as an entry in persistent storage media (e.g., a persistent log 540) local to the frontend data service 510. The snapshot metadata 530 includes information describing the snapshot data, e.g., a logical offset range of the snapshot vdisk 470. In an embodiment, the snapshot metadata 530 is stored as an entry of the persistent log 540 in a format such as, e.g., snapshot ID, logical offset range of snapshot data, logical offset into the data object to support storing multiple extents into a data object, and data object ID. The frontend data service 510 updates the snapshot metadata 530 of the log entry for each data object 440 flushed to the backend data service 550 and maintains offset of the data object where extents of the snapshot are stored. Notably, the snapshot metadata 530 is used to construct the index data structure 600 of LTSS.

Illustratively, the index data structure 600 is configured to enable efficient identification (location) and retrieval of data blocks of the snapshots contained within numerous data objects 440 stored on the object store 460. Effectively, the index data structure acts as an independent database organized to retrieve data by extent of a vdisk (as recorded in the associated object store of the archival storage system) according to any snapshot. In essence, the index metadata structure is a searchable mapping of snapshot extents to objects (and offsets within those objects) of the object store. Notably, each snapshot is associated with a corresponding index data structure and may include incremental changes to a prior snapshot that may reference a prior index data structure associated with the prior snapshot. In this manner, only the incremental changes between snapshots need be stored in the archival storage system as indicated above, because later index data structures may reference (via prior index data structures) older blocks in prior snapshots.

Accordingly, the index data structure 600 may be extended to embody a plurality of "cloned," e.g., copy-on-write, index structures associated with many of the data objects 440 of LTSS 500 to enable the location and retrieval of the data blocks. To that end, a snapshot configuration repository 560 (e.g., database) is provided, e.g., on storage media local to the LTSS data services, to locate a snapshot index data structure that is dynamically query-able by the data services to select a snapshot (i.e., the repository is organized according to snapshot) and its corresponding index data structure 600 of a data object, e.g., from among the numerous (cloned) index data structures. Further, the repository 560 may also be stored on the object store 460 to ensure fault tolerance, durability, and availability.

In an embodiment, the snapshot configuration repository 560 is organized as a key-value store that provides a higher-level of indexing (i.e., higher than the actual index data structure) to resolve to a snapshot corresponding to a (cloned) index data structure used to retrieve one or more data blocks for data objects stored in the object store 460. The snapshot configuration repository 560 is managed separately from the object store (e.g., remote from the object store media) and points to roots of the (cloned) index structures associated with snapshot data objects (e.g., using a remote referencing mechanism such as a URL to a root node of a cloned index structure resident on object store media located on the network/internet.) Such remote referencing enables indexing of an essentially infinite storage capacity of the LTSS object store, e.g., among various cloud service providers (CSPs) such as AWS, Google, Azure and the like, that is not limited by an address space (file space, namespace) of a (client) distributed file system. Note that the limited address space of such client file systems also limits the amount of "active" file system snapshots that can be maintained on the client's storage (such as a volume).

In an embodiment, the snapshot configuration repository 560 may be used as a search engine to enable efficient locating and retrieving of a data block from the selected object. Similar to the persistent log 540, the snapshot configuration repository 560 includes configuration information about each snapshot and associated data object as well as pointers to the roots of the index data structures for the data objects. The repository 560 may also be indexed by logical timestamp or VM/vdisk name of a snapshot. The snapshot may then be selected and a pointer to a root node of the corresponding index data structure 600 may be identified to access a specified logical offset range of a snapshot. Notably, the index data structure 600 is configured to translate (map) the logical offset range (address space) of data in the snapshot to the data object address space of the object store hosting the snapshot data to thereby enable efficient (i.e., bounded time) retrieval of the snapshot data from the object store independent of the number of snapshots.

Figure 6:
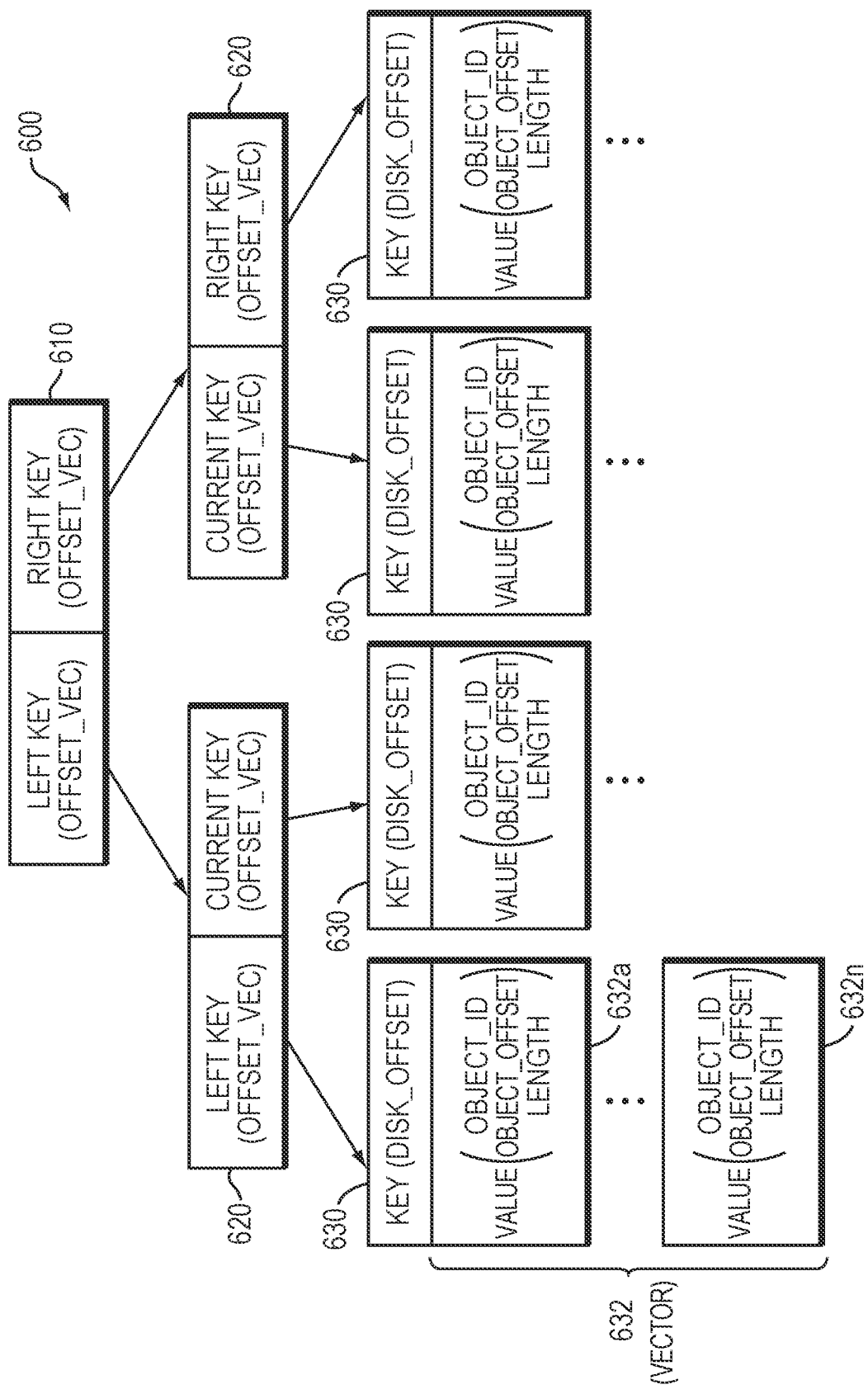
FIG. 6 is a block diagram illustrating an index data structure configured for efficient retrieval of snapshots from the LTSS of the archival storage system.

FIG. 6 is a block diagram illustrating the index data structure 600 configured for efficient retrieval of snapshots from the LTSS of the archival storage system. In one or more embodiments, the index data structure 600 is illustratively a balanced tree (e.g., a B+ tree) with a large branching factor for internal nodes to maintain a limited depth of the tree, although other types of data structures, such as bitmaps, heaps, and hashes, may be used with the embodiments described herein. When embodied as the B+ tree, the index data structure includes a root node 610, one or more intermediate (internal) nodes 620 and a plurality of leaf nodes 630. For the reference snapshot vdisk 470a, each internal node 620 contains a set of keys that specify logical offset ranges into the address space of the vdisk 470a and corresponding values that reference other nodes in the B+ tree (e.g., lower-level internal nodes or leaf nodes). Each leaf node 630 contains a vector 632 of one or more values 632a-n describing (references embodied as segment descriptors) one or more data object(s) having the extent(s) that includes the selected data blocks corresponding to the specified logical offset range as well as a logical offset of the extent in the data object and length of the extent. In other words, a leaf node can be considered as a 4-tuple having: (i) a logical offset in the address space of the logical entity (e.g., snapshot), (ii) a data object id, (iii) a logical offset of the extent into the data object, and (iv) a length of the extent. The technique only requires traversing the depth of a (cloned) index data structure to find the leaf node 630 pointing to a selected data block of a particular snapshot within the address space of a data object in the object store. Notably, a large branching factor for nodes, e.g., 1024 for leaf nodes and 32×1024=32K for internal nodes, permits a very large number of references in the internal nodes 620 of the B+ tree so that a depth of the tree is reduced (e.g., to 2 or 3 levels) enabling an effective bounded traversal time from the root node to a leaf node (e.g., traverse at most 3 nodes to locate data in the object store). The address space covered by the leaf nodes is of variable length and depends upon a number of extents referenced according to the branching factor. In an embodiment, the internal nodes have a branching factor much larger than the leaf nodes to support a very large address space (e.g., given an extent size of less than 1 MB and a branching factor of 32K, a two-level B-tree can reference an address space as great as 16 exabytes).

In an embodiment, each internal node 620 contains keys and pointers to children nodes, and generally not any values. The root node 610 is a variant of the internal node 620 but similar to the internal node, contains disk offsets as keys. For each key, a left pointer points to data of the vdisk ranging from a left key to (and including) a current key; illustratively, data in a "child" internal node 620 for the left pointer embodies the form [left key, current key]. A right pointer points to data of the vdisk ranging from the current key to (but excluding) a right key; illustratively, data in a child internal node for the right pointer embodies the form [current key, right key]. The fields of the internal node illustratively include (i) Offset_Vec containing a list of offsets in the vdisk that function as a key; and (ii) Child_Pointer_Vec containing a pointer to a child node.

As indicated previously, the leaf node 630 contains a vector (e.g., predetermined number) of segment descriptors (e.g., up to 1024), each of which describes the vdisk address space covered by the descriptor corresponding to information in the form of the following keys and values forming the descriptor for locating data in the object store:

Key (Disk_Offset)→Value (Object_ID, Object_Logical_Offset, Length)

wherein Disk_Offset refers to the offset within the vdisk; Object_ID identifies the data object in the archival storage system and may be a combination of a vdisk uuid (universally unique identifier) and an assigned predefined (e.g., 64-bit integer) number; Object_Logical_Offset is the logical offset with the object (specified by Object_ID) at which the data resides; and Length is the number of contiguous bytes (size of the extent) beginning at "Offset" (Disk_Offset) that is pointed to by the key entry. Notably, additional keys may be used in the descriptor, such as the logical timestamp when the data was written and a snapshot identifier.

Referring to FIGS. 4 and 5, assume the CVM 300 generates the reference snapshot as snapshot vdisk 470a for vdisk 235 and having a size of 1 TB with an assigned vdisk ID of, e.g., 1. The CVM 300 replicates the data blocks of the snapshot vdisk 470a to the LTSS 500 in accordance with a first replication API call that identifies the vdisk ID 1 and the snapshot vdisk 470a as, e.g., snapshot ID 1. In response to receiving the first replication API call, the frontend data service 510 "buffers" the changed data blocks to a preferred size (e.g., 16 MB) of the object store and writes the blocks into a plurality of ("n") data objects 440 assigned, e.g., data object IDs 1–n. The frontend data service 510 also records snapshot metadata 530 describing the written data blocks (e.g., vdisk ID 1, snapshot ID 1, logical offset range 0-1 TB, data object IDs 1a–n) to the persistent log 540. After all of the data blocks are replicated and flushed to the object store 460, the frontend data service 510 constructs one or more index data structures 600 for the snapshot vdisk 470a (i.e., a parent B+ tree) using the appropriate snapshot metadata 430 for snapshot ID 1.

Assume that at the predetermined time interval, the CVM 300 generates a subsequent snapshot for the vdisk 235 (e.g., snapshot vdisk 470b) and after specifying snapshot 470a as a reference snapshot and performing the incremental computation, determines that the deltas (changes) of data blocks between the snapshot vdisks 470a,b lie in the offset range of 1 MB-5 MB and 1 GB-2 GB of the reference snapshot (e.g., snapshot vdisk 470a). Such deltas may be determined for a series of snapshots. For example, the CVM 300 may issue a second replication API call to the LTSS 500 that identifies the vdisk ID 1, a first snapshot vdisk 470b as, e.g., snapshot ID 2, and the logical offset range of 1 MB-5 MB for the changed data blocks. The CVM 300 then replicates the delta data blocks to the LTSS 500. In response to receiving the first replication API call, the frontend data service 510 buffers the changed data blocks to a preferred size (e.g., 16 MB) and writes the blocks into a data object 440 assigned, e.g., an object ID 2. The frontend data service 510 also records snapshot metadata 530 describing the written data blocks (e.g., vdisk ID 1, snapshot ID 2, logical offset range 1 MB-5 MB, object ID 2) to the persistent log 540.

After all of the changed data blocks are replicated and flushed to the object store 460, the frontend data service 510 constructs an index data structure 600 for the first snapshot vdisk 470b using the appropriate snapshot metadata 530 for snapshot ID 2. Assume the changed data blocks at the logical offset range 1 MB-5 MB of the snapshot vdisk 470a fit within the data object (extent) referenced by a leaf node 630 of the parent B+ tree. A new, updated copy of the leaf node may be created to reflect the changed data blocks at the logical offset range while the remaining leaf nodes of the parent B+ tree remain undisturbed. Updated copies of the internal node(s) 620 referencing the logical offset range of the changed data blocks described by the updated leaf node may likewise be created. A new "cloned" B+ tree is thus constructed based on the parent B+ tree using a copy-on-write technique. The cloned B+ tree has a new root node 610a and internal nodes 620 that point partially to "old" leaf nodes 630 of the parent B+ tree as well as to the new leaf node 630a (not shown). Illustratively, the leaf node 630a is copied and then modified to reference the changed data. Effectively, the cloned B+ tree for the first Δ snapshot vdisk 470c is a "first child" B+ tree that shares internal and leaf nodes with the parent B+ tree.

The CVM 300 thereafter issues a third replication API call to the LTSS 500 that identifies the vdisk ID 1, a second Δ snapshot vdisk 470c as, e.g., snapshot ID 3, and the logical offset range of 1 GB-2 GB for the changed data blocks. The CVM 300 replicates the delta data blocks to the LTSS 500. In response to receiving the third replication API call, the frontend data service 510 buffers the changed data blocks to a preferred size (e.g., 16 MB) and writes the blocks into "n" data objects 440 assigned, e.g., object IDs 3a–n (not shown). The frontend data service 510 records snapshot metadata 530 describing the written data blocks (e.g., vdisk ID 1, snapshot ID 3, logical offset range 1 GB-2 GB, object IDs 3a–n) to the persistent log 540. After all of the changed data blocks are replicated and flushed to the object store 460, the frontend data service 510 constructs one or more second child B+ trees for the second Δ snapshot vdisk, as described above. Notably, a large branch factor of the B+ tree permits a very large number of references in the internal nodes of the B+ tree to support a correspondingly large number of changes between snapshots so that the index structure depth of the tree may be maintained at a maximum depth (e.g., 2 to 3 levels) enabling rapid traversal time from the root node to a leaf node. That is, no matter how many snapshots exist, references to the oldest data remain referenced by the newest snapshot resulting in a fixed number of node traversals to locate any data.

Operationally, retrieval of data blocks (snapshot data) by the LTSS data services from any snapshot stored in the archival storage system involves fetching the root of the index (B+ tree) data structure 600 associated with the snapshot from the snapshot configuration repository 560, using the offset/range of the snapshot data block(s) to be retrieved as a key to traverse the tree to the appropriate leaf node 630, which points to the location of the data blocks in the data object 440 of the object store 460. For incremental restoration of snapshot data, the technique further enables efficient computation of differences (deltas) between any two snapshots using the index metadata rather than information within the snapshot itself. In this manner, a delta between any two snapshots no matter how far apart (i.e., independent of a number of intervening snapshots) may be computed without accessing metadata of the intervening snapshots. In an embodiment, the LTSS data services perform the delta computations by accessing the snapshot configuration repository 560, identifying the root nodes 610 of the corresponding index data structures 600 (e.g., B+ trees) for the two snapshots, and traversing their internal nodes 620 all the way to the leaf nodes 630 of the index data structures to determine any commonality/overlap of values. All leaf nodes 630 that are common to the B+ trees are thus eliminated, leaving the non-intersecting leaf nodes corresponding to the snapshots. The leaf nodes of each tree are traversed to obtain a set of <logical offset, object ID, object offset> tuples and these tuples are compared to identify the different (delta) logical offset ranges between the two snapshots. These deltas then may be accessed from the data objects and provided to a requesting client.

The embodiments described herein are directed to a site and storage tier aware technique for replicating data from a primary site to a secondary site in a multi-site data replication environment configured as, e.g., backup, archival storage, and disaster recovery (DR) deployments. Illustratively, the primary site is embodied as an on-premises cluster configured to generate and replicate data (e.g., application data of a workload) as one or more snapshots for storage on the secondary site, which is embodied as an archival storage appliance configured to provide a backup data service to cloud storage of a cloud service provider (CSP). The replicated snapshots include a full baseline snapshot followed by incremental snapshots, any of which may be retained as one or more recovery points (RPs) at the sites. Notably, the CSP such as, e.g., Amazon Web Services (AWS) S3 storage services, Google Cloud Storage, Microsoft Azure Cloud Storage and the like, may offer various/different tiers of cloud storage of, e.g., an object store, for storing the RPs at the secondary site.

In an embodiment, a control plane service (e.g., replication manager 320) executing on a node of the on-premises cluster cooperates with a data plane service (e.g., data I/O manager 330) of the cluster to generate, replicate, and retrieve the RPs to/from LTSS 500 of the archival storage appliance for storage on the cloud storage. To that end, the replication manager 320 may also cooperate with the LTSS 500 to implement a storage tier aware reference resolver of the technique to determine (i) an amount of RP data transfer associated with the replication (or retrieval) and (ii) metadata (location information) identifying a specific cloud storage tier having the RP data as well as location information within that cloud storage tier storing the RP data in the object store 460.

In an embodiment, the site and storage tier aware technique is also configured to retrieve data from the secondary site to the primary site for use as a reference RP when restoring application data of the workload in the multi-site data replication environment deployments. Here, the storage tier aware reference resolution aspect provides two additional factors to consider when retrieving data of a reference RP from cloud storage: (iii) the time needed to retrieve the data, i.e., a time factor (duration); and (iv) the cost (financial expense based on CSP fees) needed to retrieve the data, i.e., a cost factor. Note that the reference RP may be physically stored in a separate disaster zone (fault domain) at the secondary site. According to the location aspect (i.e., reference resolver) of the technique, the fault domain may be in a different region (or different storage tier within the different region) from the primary site. The location aspect may be subsumed within the cost factor to retrieve data.

According to the site and storage tier aware technique, knowledge of where the data is stored enables optimization of the time and cost factors, e.g., if optimizing for cost, the time to retrieve the data may take a relatively long time, whereas if optimizing for time, the storage cost to retrieve the data may be relatively expensive/costlier. For example, a DR environment deployment may optimize for the time factor (to quickly retrieve the data) based on a recovery time objective (RTO) constraint, whereas an archival storage environment deployment may optimize for the cost factor (to reduce the cost to retrieve data).

The replication manager 320 and LTSS 500 may further cooperate to implement a site aware reference resolver of the technique to determine an optimal RP to use as a reference RP, e.g., for restoring the workload at the primary site in the event of a failure. This aspect of the technique involves consideration of (v) which RPs have been replicated from the primary site to the secondary site and (vi) which RPs have been retained for storage at the sites. For example, the primary site may not replicate all snapshots (as RPs) to the secondary site and, furthermore, the primary site may not retain all RPs that are replicated to the secondary site. Depending on which snapshots have been replicated and retained, the sites may cooperate to optimize on which snapshot is chosen as a RP reference.

Figure 7:
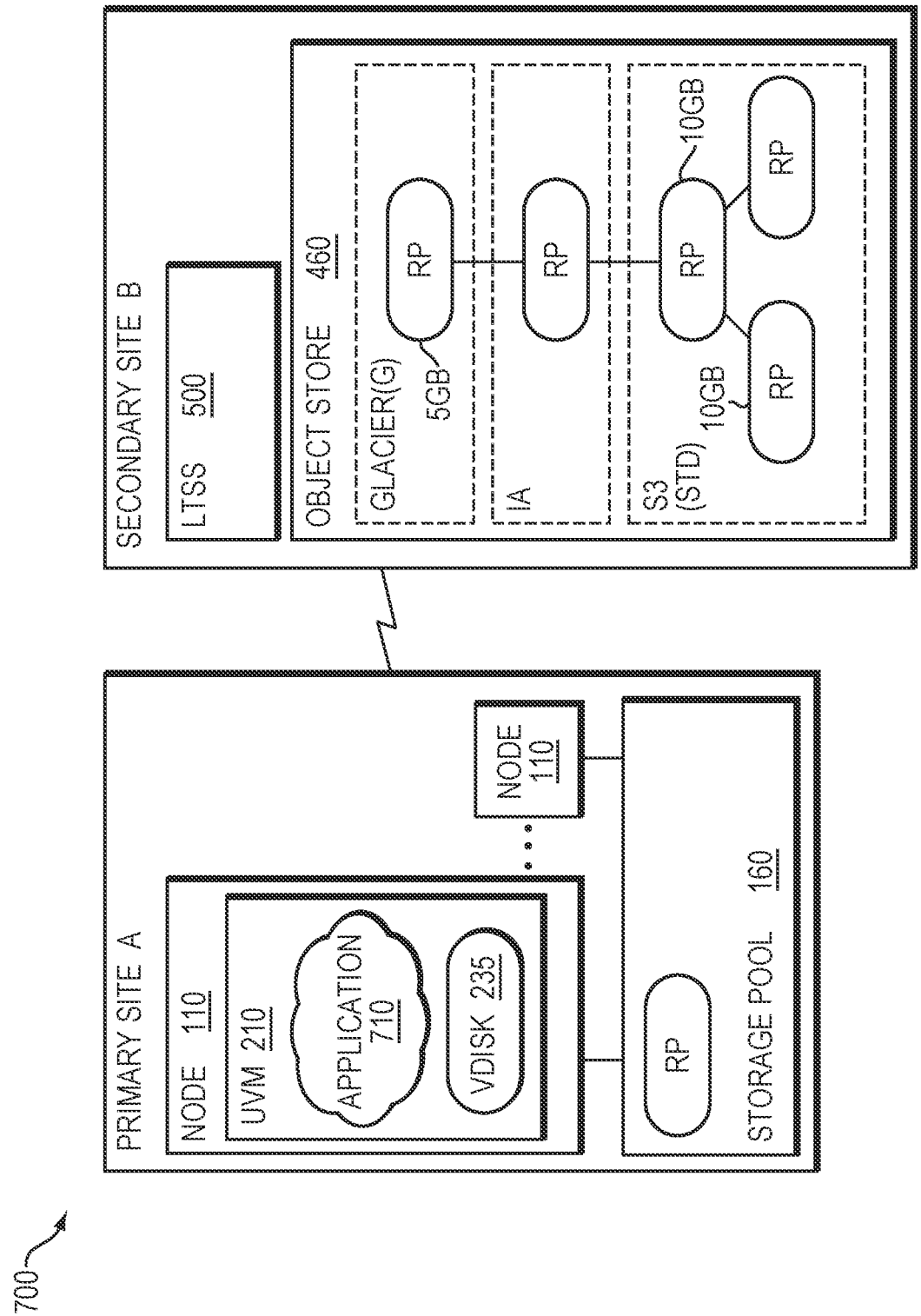
FIG. 7 is a block diagram of an exemplary multi-site data replication environment configured to replicate snapshots for storage to an appliance of an archival storage system in a disaster recovery (DR) deployment.

FIG. 7 is a block diagram of an exemplary multi-site data replication environment configured to replicate snapshots for storage to an appliance of an archival storage system in a disaster recovery (DR) deployment. The environment 700 includes two sites: a primary site A (e.g., on-premises cluster) and a secondary site B (e.g., archival storage system embodied as object store 460) serviced by the appliance (e.g., LTSS 500). Data of workload (e.g., vdisk 235) is replicated as one or more snapshots (RPs) from the on-premises cluster to the object store 460 using LTSS 500, wherein data replication involves initial synchronous or asynchronous replication of the vdisk (e.g., a full baseline snapshot vdisk 470a) followed by periodic incremental replication of changes (e.g., deltas) to the vdisk (e.g., Δ snapshot vdisk 470c), any of which may be retained as one or more RPs at the sites.

As noted, the technique described herein is directed to replication and restoration of RPs. It is desirable to transfer the least amount of data (if time bound) or expend the least amount of cost (financial expense, if so bound) during replication and recovery/restore. During replication, LTSS 500 creates an index (B+ tree) data structure 600 for each replicated snapshot (RP) and may insert information (e.g., location metadata) into additional data structures (e.g., segment descriptors) of the leaf nodes 630 directed to the storage tier of the object store 460 used to store data (e.g., data ranges) of the RP specified in those leaf nodes. Thus, given a particular range of data blocks to retrieve, LTSS 500 can determine from the leaf nodes in which storage tiers the data blocks reside. Note that storage access costs to access (retrieve) the stored data may change depending on CSP cost (i.e., pricing) adjustments, which may be available to both the primary and secondary sites.

Restoration of the data (workload) may be achieved in accordance with two options. If the workflow involves processing of a time-critical workload, such as a live application 710 executing in UVM 210 on a node 110 of the primary site A that is compromised or otherwise fails, the technique may leverage the time to retrieve factor when selecting a reference snapshot (RP) that optimizes on time to retrieve the data to ensure restoration of the live application 710 as soon as possible. For example, assume a ransomware attack on the primary site A of the DR environment deployment 700 that compromises data of the live application 710 running on the primary site A. It may be desirable to go back in time to an archived snapshot that was not infected in order to restore the data. This may require quick (fast) iteration over many snapshots to find a place in time prior to infection. For this deployment, the technique may optimize for "time to retrieve data" (time factor as duration) since cost is likely not a constraint because compromised data impacts business.

However, if the workflow does not involve such time-critical workload processing (e.g., not a live application requiring failover), the technique may leverage the cost to retrieve factor when selecting a reference RP to ensure a low cost to retrieve the data. As an example, assume a data analytics workflow where a client runs analyses on data in long-term storage (cold) data. For this archival storage deployment, the technique may optimize for lower cost (i.e., less expense) to retrieve the data even if the time to retrieve the data may be relatively long.

If cloud storage is employed at the secondary site B (e.g., by AWS S3 storage services), some of the retained snapshots (RPs) may be stored in various tiers of cloud storage such as, e.g., S3 Standard (Std.), IA and/or Glacier, of the object store 460. Illustratively, the RP data may be initially stored in the S3 Std. (Std.) storage tier and subsequently moved to IA and/or Glacier (G) tier. Assume that each RP stored in the G tier contains 5 G of data and each RP stored in the Std. tier contains 10 G of data. Even though the RPs stored in the Std. tier contain larger amounts of data than the G tier (and a concomitant higher cost to retrieve), the S3 Std. tier provides faster time to retrieve that data.

If a snapshot (e.g., a RP) is entirely stored in a single cloud storage tier, disk configuration information directed to the "cost to retrieve" and "time to retrieve" factors may be stored as RP statistics (stats), e.g., in a database local to the replication manager 320. If the RP is stored across different storage tiers (i.e., portions of the RP are located in different storage tiers), location metadata associated with the cloud storage tier of the RP may be stored in leaf nodes 630 of the index data structure 600 corresponding to the RP. Additional computation may be needed for the "cost to retrieve" and "time to retrieve" factors to determine the optimal RP to use as a reference. Nevertheless, the determination of the optimal (best) RP to use as a reference to restore the snapshot data involves computation of the deltas in view of the cost and time factors as well as the nature of the workflow.

In an embodiment, the replication manager 320 cooperates with the data I/O manager 330 to perform read/write accesses issued by (client) application 710 executing in a UVM 210 to a data set including a plurality of vdisks at the primary site A. The replication manager 320 may issue a GetRecoveryStats function call (API) to a data service managing the database to compute the storage stats (e.g., total bytes) of data storage consumed by each vdisk 235 of the data set. The replication manager 320 may then consolidate the total data storage bytes of all vdisks in the data set for the UVM 210 to determine how much data needs to be transferred (replicated) to the secondary site B. The replication manager 320 and data I/O manager 330 then generate one or more snapshots of the vdisks 235 and the snapshots (RPs) are (synchronously) replicated (e.g., as baseline snapshots) to LTSS. Upon completion of the replication and storage of the RPs on one or more tiers of cloud storage, LTSS 500 constructs an index data structure 600 for each RP.

Figure 8:
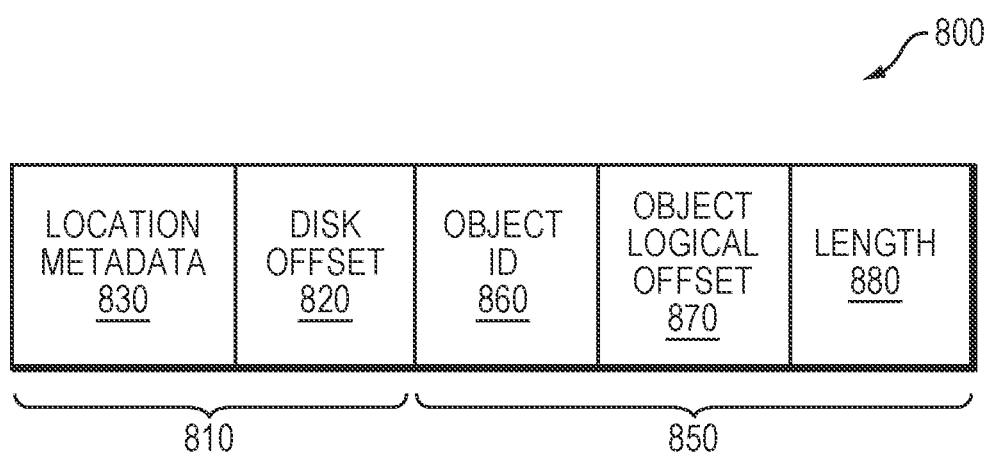
FIG. 8 is a block diagram of an exemplary segment descriptor of the index data structure used to identify a storage location of a snapshot on the archival storage system.

Illustratively, each leaf node 630 of the index data structure 600 contains a range of data within a segment descriptor, e.g., a vdisk address space range covered by the descriptor. According to the storage tier aware resolver, the location (e.g., storage tier) of that data range is also stored in the segment descriptor. In an embodiment, LTSS 500 stores the data ranges of the RPs as segment descriptors 800 in the key-value database, e.g., the snapshot configuration repository 560. FIG. 8 is a block diagram of an exemplary segment descriptor used to identify a storage location of a snapshot on the archival storage system. The segment descriptor 800 includes a key field 810 and a value field 850. As noted, the key field 810 includes a Disk_Offset 820 within the vdisk, and the value field 850 includes (i) an Object_ID 860 that identifies the data object in the archival storage system, (ii) an Object_Logical_Offset 870 that is the logical offset with the object at which the data resides; and (iii) a Length 880 that is the number of contiguous bytes beginning at the Disk_Offset pointed to by the key entry. According to the technique, the key field 810 of the segment descriptor is enhanced to include location metadata 830 that identifies the actual cloud storage tier (e.g., Std., IA and/or G) of the archival storage system (e.g., object store 460) that stores the data range of the RP. When restoring all the data needed for a reference snapshot (RP), the technique resolves (i.e., determines) the locations of all data ranges to compute a total cost of retrieval from the object store 460. An example of such an aggregate computation is as follows:

(amt of data in tier 1×cost per unit data from tier 1)+
(amt of data in tier 1×cost per unit data from tier 1)+ . . .

Thereafter, depending on the workflow and urgency of restoring data for the given workflow, the technique may render a low cost (and longer duration) determination for retrieval of the data or a shorter duration (faster time and higher cost) determination for retrieval of the data. This aspect of the technique is directed to the storage-tier aware reference resolver where there may be multiple tiers of cloud storage used to store the reference snapshots and the "cost v. time" analysis is resolved based on workflow. That is, an "expense of data retrieval vs. duration of data retrieval" tradeoff is determined according to workflow criteria (constraints) so that one or more points along the "cost v. time" curve are calculated as solutions.

In an embodiment, the reference resolution technique includes a protocol that involves an exchange of messages between an initiator and responder, where the initiator initiates the protocol message exchange with a request to find a suitable reference snapshot (RP) based on certain constraints (factors) and the responder responds to the request with a set of suggested reference RP candidates based on those factors. For example, the primary site A (e.g., initiator) may exchange messages with the secondary site B (e.g., responder) indicating a desire to replicate and/or recover a RP with constraints directed to optimizing the cost or time factor. Knowing where the data of the reference RPs are stored (e.g., the cloud storage tier), the responder may respond with, e.g., a list of suggested RPs that can be used as reference RPs based on the cost or time factor. The initiator may then select one of the suggested RPs to use as a reference RP.

In an embodiment, each vdisk has configuration information stored as "disk config" in a local database that indicates the amount of data contained in the vdisk and that needs to be replicated as a snapshot (RP). The replication manager 320 on the primary site A may issue a GetRecoveryStats API call to a data service of the local database to fetch the RP stats needed to render a reference RP decision. The primary site A may retain only a few snapshots (RPs) because of the cost of storage (and workload executing) on the primary site. As a result, the secondary site B may retain a larger number of RPs in the object store 460. The secondary site B is thus qualified to suggest reference RPs because it has a larger inventory of references to render an optimal reference resolution RP selection based on constraints (e.g., cost or time) provided by the primary site A. The location (e.g., storage tier) of the replicated RP data stored in the object store may be contained in the leaf nodes 630 of the index data structure 600 associated with the replicated RP and is available to the secondary site B when rendering the reference resolution RP selection.

In an embodiment, the primary site A (on-premises cluster) protects its workload with one or more RPs replicated and stored at the secondary site B (LTSS 500 and object store 460). LTSS 500 has knowledge about the storage layout (inventory and storage tier location of that inventory) of existing RPs in the object store 460. Therefore, LTSS can provide an accurate determination as to which RPs are optimal reference candidates for the on-premises cluster to use for efficient incremental replication of changed data (deltas). The on-premises cluster may render the final decision as to the reference RP in view of the cost (expense) and time (duration) factors by, e.g., pruning the reference candidates to a desired/selected reference RP. Alternatively, the on-premises cluster may decide there is no optimal reference RP and initiate full, synchronous replication of a baseline snapshot. Notably, the cost of storage is known to the entity (secondary site) which handles the storage tiering of the data (e.g., the CSP is aware of data retrieval fees based on CSP storage tier).

Figure 9:
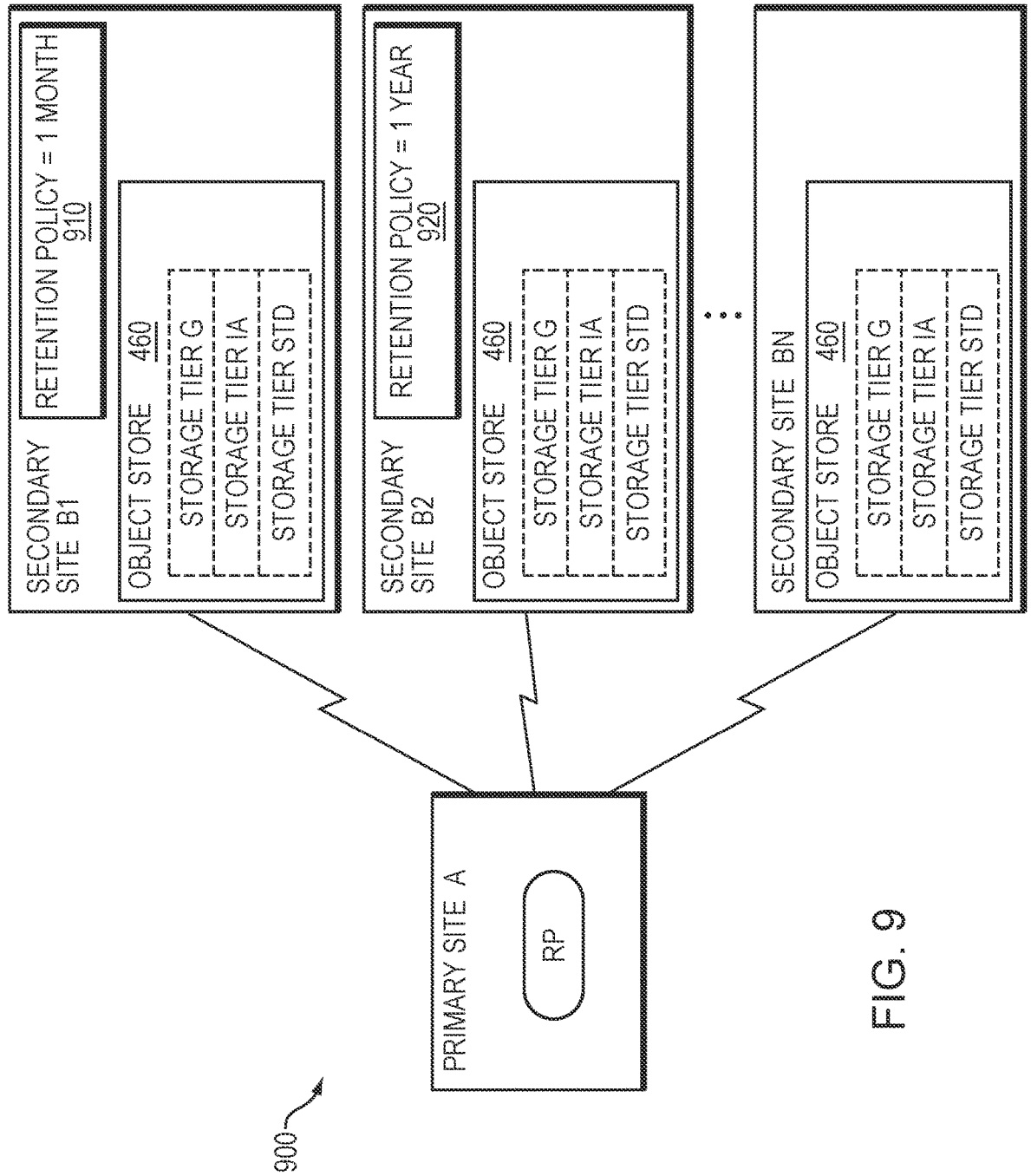
FIG. 9 is a block diagram of an exemplary multi-site data replication environment configured to replicate snapshots in a DR deployment.

In an embodiment, the site aware reference resolver may be directed to a multi-site (more than two) replication topology 900 where the primary site A replicates snapshots (RPs) to N number of secondary sites B1-N. FIG. 9 is a block diagram of an exemplary multi-site data replication environment configured to replicate snapshots in a DR deployment. Each secondary site B1-N may include an object store 460 with multiple tiers of cloud storage (e.g., storage tier G, storage tier IA and storage tier STD). Each RP that is replicated from the primary site A to a secondary site B1-N may have a different retention period as specified by a retention policy at each site. For example, secondary site B1 may be configured to retain an RP (e.g., as a reference RP) for 1 month according to retention policy 910, whereas secondary site B2 may be configured to retain an RP for 1 year according to retention policy 920. Depending on when the primary site attempts to restore a particular snapshot, the technique may process, e.g., snapshot metadata, to determine to which site a potential reference RP is replicated and the retention period of that reference period at that site.

Figure 10:
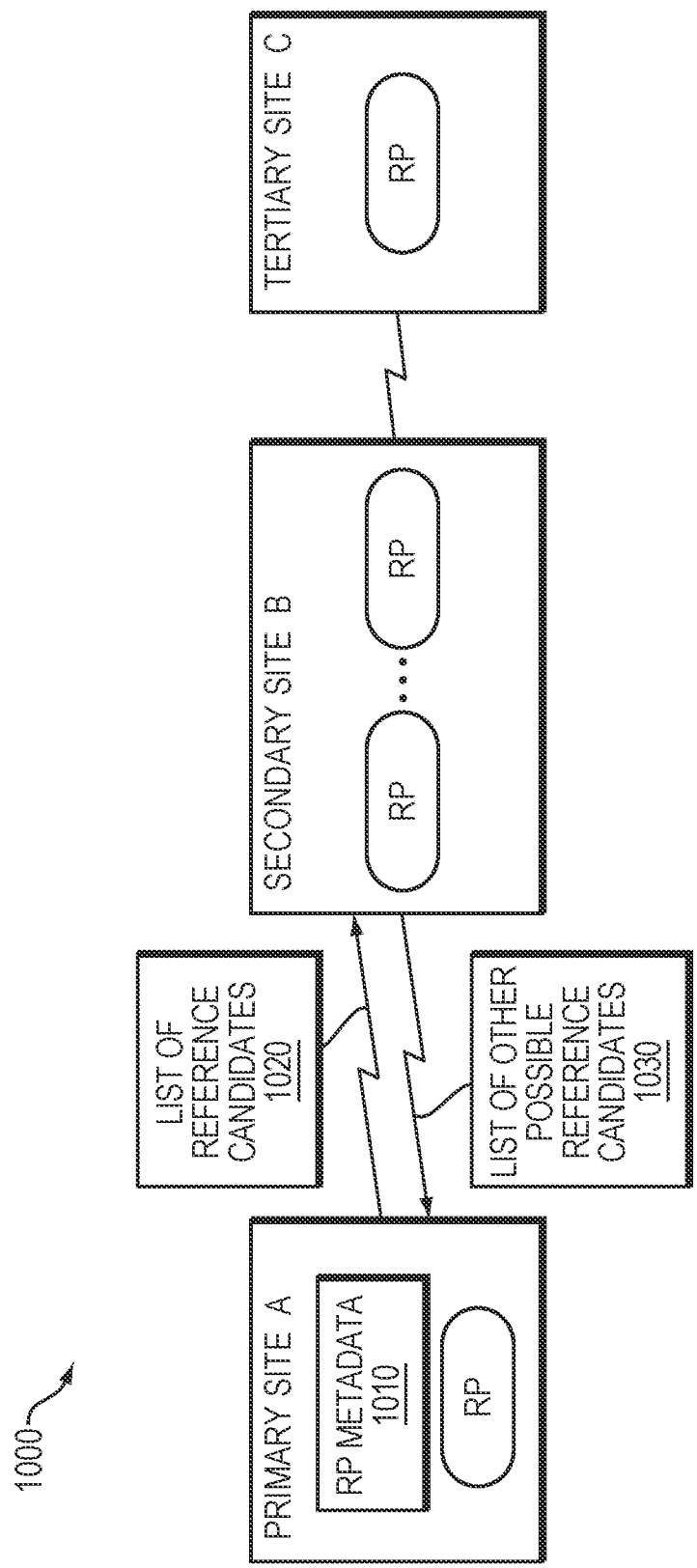
FIG. 10 is a block diagram of another exemplary multi-site data replication environment configured to replicate snapshots in a DR deployment.

FIG. 10 is a block diagram of another exemplary multi-site data replication environment configured to replicate snapshots in a DR deployment. In an embodiment, the site aware reference resolution aspect of the technique is directed to a multi-site (more than two) cascaded replication topology 1000 where primary site A replicates one or more snapshots (RPs) to secondary site B which, in turn, replicates one or more RPs to tertiary site C. In such a cascaded topology 1000, RP metadata 1010 present on site A only has information about the RPs replicated to site B, but not site C because site B replicates sRPs to site C.

In an embodiment, the secondary site B may have a larger inventory of reference (RP) candidates than the primary site A. As a result, primary site A may send a list of reference candidates 1020 to the secondary site, which may have the listed candidates and be able to select a reference RP based on, among others, the time and cost factors, i.e., resolve a "best" reference RP according to time and cost factors for data retrieval. However, it is possible that, as a result of its retention policy, site B may not have any of the listed reference candidates. According to the site aware aspect of the technique, site B would reply to site A with a list of other possible reference candidates 1030 including suggesting performance of a baseline (full) replication of a desired RP. Here, the secondary site B participates in a site aware reference resolver protocol exchange to resolve the reference candidate selection in an efficient manner such that the primary site A may narrow its list of reference candidates based on feedback from the secondary site. By allowing both sites to participate in reference resolution, the technique enables fast and efficient convergence on a specific reference RP, i.e., rendering of a reference candidate selection.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   replicating and incrementally updating data as one or more recovery points (RPs) from a primary site to one or more storage tiers of a multi-tiered archival storage system at a secondary site, wherein the secondary site retains an inventory of RPs larger than that of the primary site;
   initiating by the primary site a protocol message exchange with the secondary site to identify one or more candidate locations to use for retrieval of the data based on locations of the RPs among the one or more storage tiers, wherein the protocol message exchange includes constraints provided by the primary site of an expense to extract the data and a duration to extract the data from the one or more storage tiers; and
   retrieving the data at the primary site from the secondary site using incremental differences of the data based on a reference RP, wherein the reference RP is rendered from a reference resolution selection based on the constraints provided by the primary site as well as the larger inventory of RPs retained at the secondary site and the identified candidate location of the data.

2. The method of claim 1, further comprising:
   providing a list of the candidate locations to the primary site from the secondary site; and
   pruning the list of candidate locations, wherein the identification of the candidate location to use for the data retrieval is made at the primary site.

3. The method of claim 1, further comprising:
   replicating the RP to another secondary site having a retention policy longer than that for the RP at the secondary site, wherein the identified candidate location includes the RP at the another secondary site.

4. The method of claim 1, wherein the retrieved data of the RP is from a plurality of candidate locations and the identification of the candidate location to use for retrieval of the data includes an aggregation of the plurality of candidate locations according to the constraints.

5. The method of claim 1, wherein the constraints optimize for a lowest duration to retrieve the data.

6. The method of claim 1, further comprising cascade replicating the RP to a tertiary site from the secondary site, wherein the replicated RP to the tertiary site is included in the candidate locations.

7. The method of claim 1, wherein the primary site includes the RP with a retention policy shorter than that of the secondary site.

8. The method of claim 1, wherein the identified candidate location at the archival storage system is stored in an index data structure created when the RP is replicated to the secondary site.

9. A non-transitory computer readable medium including program instructions for execution on a processor, the program instructions configured to:
   replicate and incrementally update data as one or more recovery points (RPs) from a primary site to one or more storage tiers of a multi-tiered archival storage system at a secondary site, wherein the secondary site retains an inventory of RPs larger than that of the primary site;

initiate by the primary site a protocol message exchange with the secondary site to identify one or more candidate locations to use for retrieval of the data based on locations of the RPs among the one or more storage tiers, wherein the protocol message exchange includes constraints provided by the primary site of an expense to extract the data and a duration to extract the data from the one or more storage tiers; and retrieve the data at the primary site from the secondary site using incremental differences of the data based on a reference RP, wherein the reference RP is rendered from a reference resolution selection based on the constraints provided by the primary site as well as the larger inventory of RPs retained at the secondary site and the identified candidate location of the data.

10. The non-transitory computer readable medium of claim 9 wherein the program instructions are further configured to:

provide a list of the candidate locations to the primary site from the secondary site; and prune the list of candidate locations, wherein the identification of the candidate location to use for the data retrieval is made at the primary site.

11. The non-transitory computer readable medium of claim 9 wherein the program instructions are further configured to:

replicate the RP to another secondary site having a retention policy longer than that for the RP at the secondary site, wherein the identified candidate location includes the RP at the another secondary site.

12. The non-transitory computer readable medium of claim 9 wherein the retrieved data of the RP is from a plurality of candidate locations and the identification of the candidate location to use for retrieval of the data includes an aggregation of the plurality of candidate locations according to the constraints.

13. The non-transitory computer readable medium of claim 9 wherein the constraints optimize for a lowest duration to retrieve the data.

14. The non-transitory computer readable medium of claim 9 wherein the program instructions are further configured to cascade replicate the RP to a tertiary site from the secondary site, wherein the replicated RP to the tertiary site is included in the candidate locations.

15. The non-transitory computer readable medium of claim 9 wherein the primary site includes the RP with a retention policy shorter than that of the secondary site.

16. The non-transitory computer readable medium of claim 9 wherein the identified candidate location at the archival storage system is stored in an index data structure created when the RP is replicated to the secondary site.

17. An apparatus comprising:

a network connecting a node of a primary site to a secondary site, the node having a processor configured to execute program instructions configured to:

replicate and incrementally update data as one or more recovery points (RPs) from a primary site to one or more storage tiers of a multi-tiered archival storage system at a secondary site, wherein the secondary site retains an inventory of RPs larger than that of the primary site;

initiate by the primary site a protocol message exchange with the secondary site to identify one or more candidate locations to use for retrieval of the data based on locations of the RPs among the one or more storage tiers, wherein the protocol message exchange includes constraints provided by the primary site of an expense to extract the data and a duration to extract the data from the one or more storage tiers; and retrieve the data at the primary site from the secondary site using incremental differences of the data based on a reference RP, wherein the reference RP is rendered from a reference resolution selection based on the constraints provided by the primary site as well as the larger inventory of RPs retained at the secondary site and the identified candidate location of the data.

18. The apparatus of claim 17 wherein the program instructions are further configured to:

provide a list of the candidate locations to the primary site from the secondary site; and prune the list of candidate locations, wherein the identification of the candidate location to use for the data retrieval is made at the primary site.

19. The apparatus of claim 17 wherein the program instructions are further configured to:

replicate the RP to another secondary site having a retention policy longer than that for the RP at the secondary site, wherein the identified candidate location includes the RP at the another secondary site.

20. The apparatus of claim 17 wherein the retrieved data of the RP is from a plurality of candidate locations and the identification of the candidate location to use for retrieval of the data includes an aggregation of the plurality of candidate locations according to the constraints.

21. The apparatus of claim 17 wherein the constraints optimize for a lowest duration to retrieve the data.

22. The apparatus of claim 17 wherein the program instructions are further configured to cascade replicate the RP to a tertiary site from the secondary site, wherein the replicated RP to the tertiary site is included in the candidate locations.

23. The apparatus of claim 17 wherein the primary site includes the RP with a retention policy shorter than that of the secondary site.

24. The apparatus of claim 17 wherein the identified candidate location at the archival storage system is stored in an index data structure created when the RP is replicated to the secondary site.

* * * * *